Feb. 2, 1960 A. J. FITZGERALD 2,923,038

FRAMING APPARATUS

Filed May 9, 1956

INVENTOR:
ALBERT J. FITZGERALD,

BY Charles W. Helzer

HIS ATTORNEY.

2,923,038

FRAMING APPARATUS

Albert J. Fitzgerald, Syracuse, N.Y., assignor to General Electric Company, a corporation of New York Application May 9, 1956, Serial No. 583,780
4 Claims. (Cl. 20—56.4)

The present invention relates to a framing apparatus. More particularly, the invention relates to a new and improved framing apparatus for a television receiver cabinet or the like, and to a novel means for mounting such framing apparatus about an opening to be framed.

In the manufacture of television receivers, and other similar devices, it is necessary to place a transparent safety glass over the opening in the television receiver cabinet which constitutes the viewing area of the receiver in order to guard against implosion of the television picture tube, protect against high voltages, and provide other safety and decorative measures. It is desirable that the safety glass be easily mounted on the television receiver cabinet by a suitable framing apparatus which will firmly retain the safety glass in position on the cabinet, and it is further desirable that the framing appartus be decorative as well as present a pleasing outer appearance while in position on a television receiver cabinet or the like. One suitable framing apparatus for this purpose was disclosed in co-pending application Serial Number 465,798—Glass Retainer Structure—A. J. Fitzgerald, inventor—filed November 1, 1954, now Patent Number 2,849,267, issued August 26, 1958, and assigned to the same assignee as the present invention. The framing apparatus disclosed in the above-identified patent application while suitable in most respects, has not been entirely satisfactory in service, however, in that it required certain special parts for each different size television receiver cabinet, or the like, with which it was used. To overcome this difficulty the present invention was devised.

It is therefore one object of the present invention to provide a new and improved framing apparatus that firmly retains an assembly to be framed thereby, such as the safety glass of a television receiver cabinet, in position over an opening, and which may be used on many different sized openings with only a minimum of adaptation.

Another object of the invention is to provide a framing apparatus of the above type which has a pleasing decorative outer appearance.

Still another object of the invention is to provide a framing apparatus having the above-set-forth characteristics which may be easily assembled on the cabinet or other housing with which it is used from a position exterior of such cabinet or housing.

A still further object of the invention is to provide a framing apparatus which incorporates all of the above desirable features, and which is also comparatively inexpensive to manufacture.

In practicing the invention, a framing apparatus is provided which comprises an inner corner member that includes both first and second angularly disposed legs joined in abutting relation at a predetermined angle. Each of the first and second legs of the inner corner member has a protuberance formed thereon proximate to the junction of such legs, and first and second outer framing members having a generally semi-tubular configuration are fitted over respective ones of the first and second legs in slidable relation thereto. An outer corner member is disposed over the inner corner member in overlapping relation with respect to the abutting ends of the outer framing members and a spring member is provided for resiliently maintaining all of the members in assembled relation. The structure thus far completed is adapted to be mounted on a suitable opening by a plurality of mounting clips which coact with the framing members to secure the framing apparatus around the opening in a cabinet or other housing. Each of these mounting clips comprises a strap of sheet material having a flat body portion, a seat portion extending transversely of the body portion, and a leg portion formed back contiguous to the seat portion on the side thereof away from the body portion. The leg portion of each mounting clip is inserted in a semi-tubular framing member comprising a part of the framing apparatus with the body portion of the clip extending out through the opening along one side of the semi-tubular framing member. A leaf spring is then inserted intermediate the seat portion of the mounting clip and an inner surface of the semi-tubular framing member for retaining the mounting clip in position on the framing member. It is also desired that a means be provided for preventing relative movement between the lead spring and the mounting clips, and additionally, a means extending from the leaf spring to facilitate snapping the leaf spring into position should be included.

Other objects, features and many of the attendant advantages of the invention will be appreciated more readily as the same becomes better understood by reference to the following detailed description, when considered in connection with the accompanying drawings, wherein like parts in each of the several figures are identified by the same reference character, and wherein.

Figure 1:
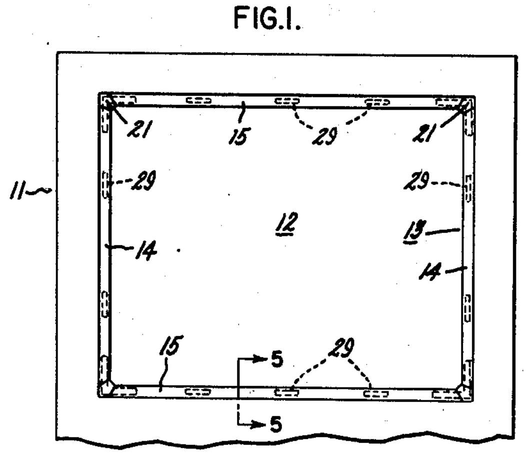
Figure 1 is a front view of the upper part of a television receiver cabinet having a safety glass mounted thereon by means of a framing apparatus constructed in accordance with the invention.

Figure 1 of the drawings shows the top end of a television receiver cabinet 11, or some similar article, having an opening therein in which a safety glass 12 is supported by a framing apparatus 13. Framing apparatus 13 is constructed in accordance with the present invention, and forms a closed loop for surrounding the opening in cabinet 11. It is in many respects similar to the framing apparatus disclosed in the above-identified copending application Serial Number 465,798, but differs therefrom in that it is readily adapted for use in framing many different sized openings in cabinets or other similar housings. The framing apparatus 13 functions to support the safety glass 12 in position over the opening in cabinet 11, and for this reason, it is essential that it firmly retain the safety glass 12 on cabinet 11. It is also essential that the framing apparatus present a pleasing decorative outer appearance while in the assembled position, and further, it is necessary that the framing apparatus 13 be capable of assemblage on cabinet 11 together with the safety glass 12 from a position exterior of the cabinet, and that such assemblage be readily accomplished. Additionally, it is desirable that the framing apparatus be relatively inexpensive to manufacture.

Figures 2, 3, 5:
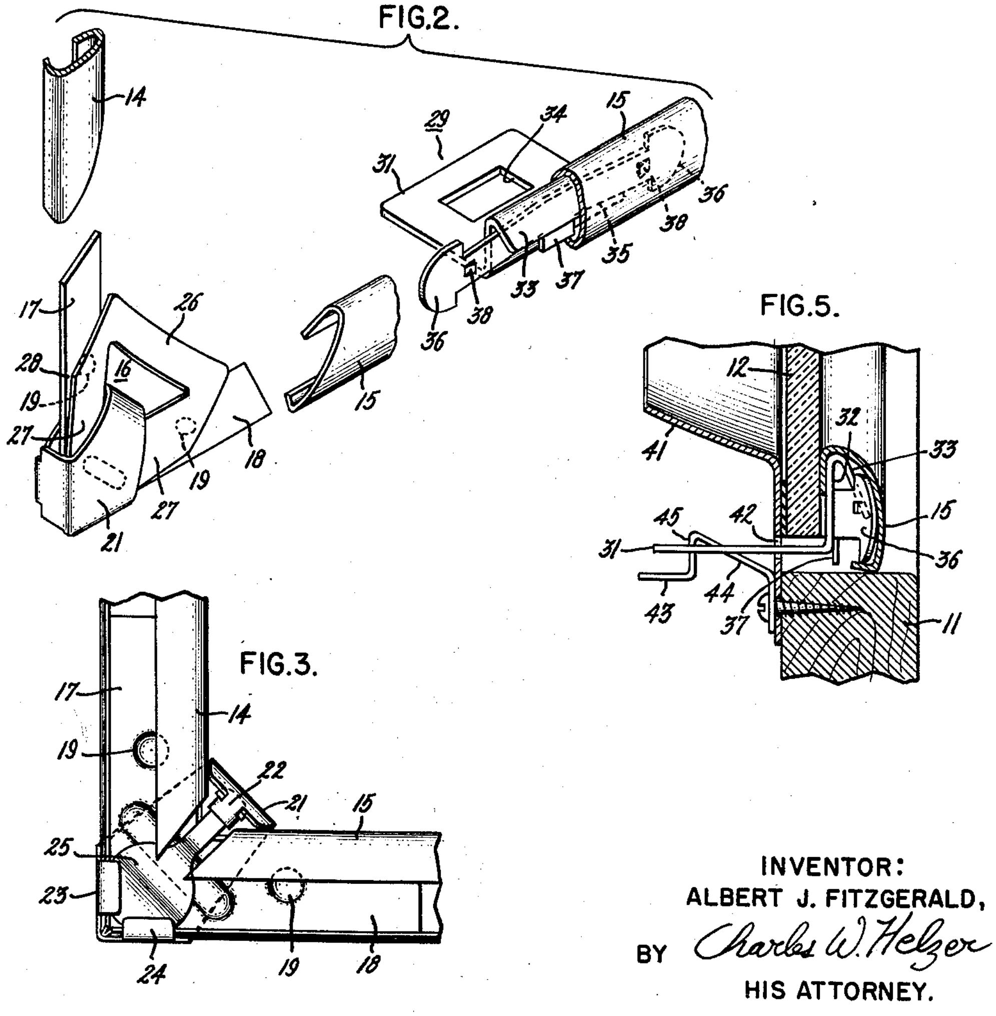
Figure 2 is a perspective view of a portion of a disassembled framing apparatus constructed in accordance with the invention.
Figure 3 is a bottom view of the corner construction of the portion of the framing apparatus illustrated in Figure 2.
Figure 5 is a cross-sectional view of the framing apparatus shown in Figure 1 taken through plane 5—5.

Framing apparatus 13 is comprised of a plurality of outer framing members 14 and 15 which are held together by a plurality of corner assemblies to form a closed loop. As is best shown in Figure 2 of the drawings, each of the corner assemblies comprises an inner corner member 16 having first and second angularly disposed legs 17 and 18, respectively, joined in abutting relation at a predetermined angle. In the particular embodiment of the invention disclosed the legs 17 and 18 of the inner corner member 16 are disposed at right angles with respect to each other, and each has a small protuberance 19 formed thereon proximate to the juncture of the legs whose function will be described more fully hereinafter. The outer framing members 14 and 15, hereinafter referred to as first and second generally semi-tubular outer framing members 14 and 15, respectively, are fitted over respective ones of the legs 17 and 18 in slidable relation thereto in the manner shown. While the outer framing members 14 and 15 have been described as generally semi-tubular, it is to be understood that they may comprise any elongated member having a semi-closed cross section, such as a semi-circular or U-shaped cross section, that is easily adapted to be fitted over the leg portion 17 and 18 of inner corner member 16 in a telescopic fashion.

An outer corner member 21 is disposed in overlapping relation with respect to the abutting ends of the outer framing members 14 and 15, respectively, and the inner corner in the manner best seen in Figure 3 of the drawings. The outer corner member 21 is comprised of sheet material, preferably sheet metal, that is folded to form a tapered inner portion that is bent inwardly to define an inner tab portion 22, and a pair of outer tab portions 23 and 24 that are bent downwardly and inwardly, and are displaced at right angles with respect to each other. By this construction, the inner tab portion 22 and the outer tab portions 23 and 24 coact to provide a means for retaining a spring member 25 in position. The spring member 25 is described more fully in the above-identified co-pending patent application; however, from an examination of Figure 3 it can be appreciated that spring member 25 is shaped in such a fashion, by bowing the spring member, that upon being assembled as described, it clamps and frictionally retains the outer corner member 21 in position over the abutting ends of the outer framing members 14 and 15, and the inner corner member 16. Hence, it can be stated that the spring member 25 serves to resiliently maintain all of the members of the corner assembly of the framing apparatus in assembled relation.

After fabrication of all of the parts for the corner assemblies of the framing apparatus 13 in the manner above-described, the corner assemblies for a complete framing apparatus are preassembled by disposing an outer corner member 21 over an inner corner member 16, and a spring member 25 is inserted in position between the outer tabs 23, 24 and inner tab 22 of the outer corner member. For the purpose of facilitating this step of the preassembly operation, the edges of the inner tab 22 may be bent so as to cup around the edges of the spring member 25.

At this stage of construction, the corner assemblies are ready for assemblage with the outer framing members 14 and 15. Prior to this step, however, an isolating member 26 comprising a relatively thin sheet of tear-resistant material such as cardboard or plastic, is positioned intermediate the outer and inner corner members in the manner illustrated in Figure 2 of the drawings. The isolating member 26 has two separable leg portions 27 which are insertable under the outer corner member 21, and in this position, the interconnected end of the isolating member 26 is lifted somewhat by engagement with the protuberances 19 formed on the leg portions 17 and 18 of inner corner member 16. The lifting up of the edges of the isolating member 26, in the manner illustrated at 28, facilitates the further assembly stage of sliding the outer framing members 14 and 15 over the ends of the leg portions 17 and 18 into position under the isolating member 26, and under the outer corner member 21 in the manner best shown in Figure 3 of the drawings. The spring member 25 then resiliently retains all of the members in assembled relation, and isolating members 26 thereafter serve to prevent scratching of the outer surfaces of the outer framing members 14 and 15 and preserve their outer decorative appearance. The isolating members 26 may be left in the position shown in Figure 2 during shipment of the framing apparatus, during assemblage of the apparatus on the cabinet or other housing with which it is to be used, and during the further shipment of the cabinet or other housing to the purchaser. The isolating members 26 are removed after completing their useful function of preserving the decorative exterior surface of the outer framing members 14 and 15 during transit, assemblage and storage of the framing apparatus and the completed article on which it is used. From the foregoing description, however, it can be appreciated that the lifting up of the edges of the isolating member 26 by the protuberances 19, greatly facilitates assemblage of the corner assemblies of the framing apparatus with the outer framing members, and hence assists in reducing the overall cost of the framing apparatus.

Figure 4:
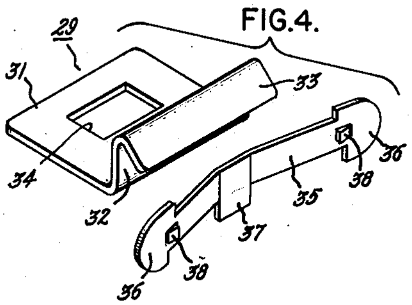
Figure 4 is a perspective view of a disassembled novel mounting means for use with the framing apparatus shown in Figures 1 and 2, and comprises a part of the present invention.

In order to mount the framing apparatus 13 over the opening in a television cabinet 11, or other housing with which the apparatus is used, a plurality of mounting clips indicated at 29 are provided. As is best seen in Figures 2 and 4 of the drawings, each of the mounting clips 29 comprises a strap of sheet material, such as sheet metal, having a flat body portion 31, a seat portion 32 extending transversely of the body portion 31, and a leg portion 33 formed back contiguous to the seat portion 32 on the side thereof away from said body portion 31. For securing the mounting clip 29 to the cabinet or other housing with which the framing apparatus is used, an aperture 34 is formed in the body portion 31 of each of the mounting clips.

In order to assemble the mounting clips 29 on the outer framing members 14 and 15 of the framing apparatus, a leaf spring 35 is provided. The leaf spring 35 comprises a flat, elongated bow-shaped member fabricated from spring metal or other similar resilient material and has enlarged end portions 36. Additionally, leaf spring 35 has a lip 37 formed on one side of the middle portion thereof to provide a means for facilitating assemblage with the mounting clips 29, and a pair of detents 38 are punched out from each end of the leaf spring adjacent the enlarged end portions 36 to provide a means for preventing relative movement between the leaf spring and its associated mounting clip.

Upon assemblying the mounting clips 29 on the framing members 14 or 15, the leg portion 33 of each mounting clip is inserted inside the semi-tubular outer framing member with the body portion 31 thereof extending out through the opening along one side of the said semi-tubular framing member. With the mounting clip 29 positioned in this fashion, a leaf spring 35 is inserted through the opening in the semi-tubular outer framing member in the manner best shown in Figures 2 and 5 of the drawings with the enlarged end portions thereof seated in the interior of the framing member and straddling the leg portions of the mounting clip, and with the middle portion thereof engaging the underside of the seat portion 32 of the mounting clip. To facilitate this assemblage, the lip 37 is provided, and serves as a means for easily depressing the middle portion of the leaf spring 35 so as to facilitate inserting the same into position under the seat portion 32 of the mounting clip. Once the leaf spring is in position, the detents 38 engage the edges of the leg portions 33, and serve as a means for preventing relative movement between the leaf spring 35 and the mounting clip 29. By this construction, the leaf spring 35 serves to tension the mounting clip 29, and retain the same in position on the framing members.

Upon completion of a framing apparatus in the above described manner, it is ready to be mounted around the opening of a housing with which it is to be used. In the present example, the framing apparatus is shown mounted around the viewing area of a television receiver cabinet 11 to retain a safety glass 12 in position over the opening. For this purpose a mask 41, shown in Figure 5, is provided around the interior of the opening in the television cabinet 11, and has a plurality of apertures 42 therein spaced adjacent the edge of the opening in cabinet 11. The mask 41 may be secured to the interior of cabinet 11 by wood screws or any other suitable means which may also serve to secure a plurality of spring mounting members 43 adjacent the apertures 42 in the mask 41, in the manner illustrated. Each of the spring mounting members 43 preferably has a canted face 44 disposed opposite the apertures 42, and ending in a stepped locking portion 45. In order to assemble the framing apparatus 13 over the safety glass 12 on cabinet 11, all that is required is that the body portions 31 of the mounting clips be inserted through the apertures 42 in the mask 41 so that the ends of the body portions 31 engage and displace the spring mounting members 43 sufficiently to allow the ends thereof to ride over the canted face portions 44 of the spring mounting member until the stepped locking portions 45 of the spring mounting member are disposed adjacent the apertures 34 in the body portion 31 of the mounting clip. Upon this eventuality, the spring mounting member 43 assumes its natural position, and results in inserting the stepped locking portion 45 behind the outer rim of the mounting clip 29 to thereby secure the same in the position indicated in Figure 5. In this manner, the framing apparatus is securely locked around the opening in cabinet 11, and retains the safety glass 12 in position.

From the foregoing description, it can be appreciated that the invention provides a new and improved framing apparatus which upon assemblage firmly retains an object, such as the safety glass of a television receiver, in position over an opening to be framed, and which may be used on many different sized openings with only a minimum of adaptation. In the instant case, the only adaptation required to use the framing apparatus on many different sized openings is that the outer framing members such as 14 and 15 be sufficiently long to circumscribe the opening to be framed. Applicant's new and improved framing apparatus, in addition to the above characteristics, presents a pleasing outer decorative appearance, and may be easily assembled on a cabinet or other housing with which it is used from a position exterior of such cabinets with a minimum of effort. Furthermore, a framing apparatus constructed in accordance with the invention is comparatively inexpensive to manufacture.

Obviously, other modifications and variations of the present invention are possible in the light of the above teachings. It is therefore to be understood that changes may be made in the particular embodiment of the invention described which are within the full intended scope of the invention as defined by the appended claims.

What I claim as new and desire to secure by Letters Patent of the United States is:

1. In a framing apparatus comprising a generally semi-tubular framing member having an inturned flange a mounting clip coacting with said framing member for securing the framing apparatus along an opening, said mounting clip comprising a strap of sheet material having a flat body portion, a seat portion extending transversely of the body portion and engageable with said inturned flange, and a leg portion formed back contiguous to said seat portion on the side thereof away from said body portion, said mounting clip being longitudinally slidable within said semi-tubular framing member with the body portion thereof extending out through the opening along one side of said semi-tubular framing member, a leaf spring compressed between the seat portion of said mounting clip and an inner surface of said semi-tubular framing member for retaining said mounting clip within said framing member, and detents on said leaf spring engageable with said clip to prevent relative longitudinal movement of said spring and clip.

2. The framing apparatus set forth in claim 1 wherein said mounting clip has an aperture formed in the body portion thereof for engagement by a spring acting clamping member, and wherein the two end portions of the leaf spring are enlarged and are seated inside said semi-tubular framing member and the middle portion of said leaf spring engages the underside of the seat portion of said mounting clip.

3. The framing apparatus set forth in claim 1 further characterized by means extending from said leaf spring to facilitate snapping said leaf spring into position intermediate the seat portion of said mounting clip and an inner surface of said semi-tubular framing member.

4. The framing apparatus set forth in claim 1 further characterized by means for preventing relative movement between said leaf-spring and said mounting clip and means extending from said leaf spring to facilitate snapping said leaf spring into position intermediate the seat portion of said mounting clip and an inner surface of said semi-tubular member and wherein the two end portions of the leaf spring are enlarged and are seated inside said semi-tubular framing member and the middle portion of said leaf spring engages the underside of the seat portion of said mounting clip.

References Cited in the file of this patent

UNITED STATES PATENTS

| | | |
|---|---|---|
| 1,817,162 | Mulligan | Aug. 4, 1931 |
| 2,270,036 | Conlon | Jan. 13, 1942 |
| 2,275,559 | Rosenblatt | Mar. 10, 1942 |
| 2,471,254 | Waara | May 24, 1949 |
| 2,679,912 | Kennedy | June 1, 1954 |
| 2,718,964 | Kilgore | Sept. 27, 1955 |
| 2,727,597 | Musgrave | Dec. 20, 1955 |
| 2,772,086 | Foster | Nov. 27, 1956 |